US006829491B1

(12) United States Patent
Yea et al.

(10) Patent No.: US 6,829,491 B1
(45) Date of Patent: Dec. 7, 2004

(54) DYNAMIC AND SELF-OPTIMIZING SMART NETWORK

(75) Inventors: Ji-Hae Yea, Kirkland, WA (US); Scot D. Gordon, Bothell, WA (US); Martin J. Feuerstein, Redmond, WA (US); Jun Liu, Bellevue, WA (US)

(73) Assignee: Kathrein-Werke KG, Rosenheim (DE)

( * ) Notice: Subject to any disclaimer, the term of this patent is extended or adjusted under 35 U.S.C. 154(b) by 652 days.

(21) Appl. No.: 09/930,523

(22) Filed: Aug. 15, 2001

(51) Int. Cl.[7] .................................................. H04Q 7/20
(52) U.S. Cl. ..................... 455/560; 455/560; 455/561; 455/403; 455/428; 455/446
(58) Field of Search ................................ 455/403, 414, 455/419, 422.1, 423, 424, 428, 432.3, 435, 435.2, 439, 507, 524, 525, 446, 560, 561, 562.1, 191.3

(56) References Cited

U.S. PATENT DOCUMENTS

| | | | |
|---|---|---|---|
| 5,889,494 A | | 3/1999 | Reudnik et al. |
| 5,930,721 A | * | 7/1999 | Fried et al. ................. 455/466 |
| 6,070,070 A | * | 5/2000 | Ladue ........................ 455/419 |
| 6,070,090 A | | 5/2000 | Feuerstein |
| H1918 H | * | 11/2000 | Hoffpauir et al. ........... 379/242 |
| 6,151,487 A | * | 11/2000 | Kim et al. ................... 455/134 |
| 6,167,256 A | * | 12/2000 | Yla-Outinen et al. ....... 455/417 |
| 6,246,674 B1 | | 6/2001 | Feuerstein et al. |
| 6,571,279 B1 | * | 5/2003 | Herz et al. .................. 709/217 |
| 6,571,283 B1 | * | 5/2003 | Smorodinsky .............. 709/220 |
| 6,615,036 B1 | * | 9/2003 | Haas et al. .................. 455/413 |
| 6,671,265 B1 | * | 12/2003 | Hwang et al. .............. 370/331 |
| 6,731,934 B1 | * | 5/2004 | Mills et al. ................. 455/433 |

OTHER PUBLICATIONS

U.S. Appl. No. 09/384,306, Feuerstein et al.
U.S. Appl. No. 09/393,124, Feuerstein.
U.S. Appl. No. 09/930,662, Gordon et al.

* cited by examiner

Primary Examiner—Cong Van Tran
(74) Attorney, Agent, or Firm—Fulbright & Jaworski LLP (57) ABSTRACT

A communication network is dynamically optimized using network operation metrics, such as may be acquired from a network controller such as a mobile switching center, to achieve network performance goals. Operational parameter adjustments, associated with a particular network resource and corresponding network resources, are preferably determined as a function of the network operation metrics. Implementation of the parameter adjustments are modeled to determine if further or different operational parameter adjustments should be determined. Preferably, actual implementation of the parameter adjustments is effected in part through providing the adjusted parameters to the network controller. Additionally or alternatively, the adjusted parameters may be provided directly to one or more network resources for implementation.

65 Claims, 8 Drawing Sheets

DYNAMIC AND SELF-OPTIMIZING SMART NETWORK

RELATED APPLICATIONS

Reference is hereby made to the following co-pending, commonly assigned, U.S. patent application serial number [47586-P055US-10025093] entitled "System and Method for Dynamically Adjusting CDMA Cell Sectorization," concurrently filed herewith, the disclosure of which is incorporated herein by reference. Reference is also hereby made to co-pending, commonly assigned, U.S. patent applications: Ser. No. 09/384,306 entitled "Antenna Deployment Sector Cell Shaping System and Method," filed Aug. 26, 1999, which is a continuation-in-part of Ser. No. 08/924,285 entitled "Antenna Deployment Sector Cell Shaping System and Method," filed Sep. 5, 1997, which is a continuation in part of U.S. Pat. No. 5,889,494 entitled "Antenna Deployment Sector Cell Shaping System and Method," filed Jan. 27, 1997, and Ser. No. 09/393,124 entitled "Input Specific Independent Sector Mapping," filed Sep. 10, 1999, which is a continuation-in-part of U.S. Pat. No. 6,070,090 entitled "Input Specific Independent Sector Mapping," filed Nov. 13, 1997, the disclosures of all of which are hereby incorporated herein by reference.

TECHNICAL FIELD

The present invention relates generally to wireless communication systems and, more particularly, to dynamically adjusting systems of a wireless communication system in response to changing network load and/or environmental conditions.

BACKGROUND

In typical cellular systems today, and more particularly, in code division multiple access (CDMA) systems, individual networks or cells are implemented with a fixed configuration. For example, across the network service area, cell sites are strategically placed to provide system access within each particular cell such that the aggregation of cells provides system access substantially throughout the network service area. Each such cell is typically substantially centered around a base transceiver station (BTS) antenna array and may be divided into multiple sectors in order to provide efficient spectrum use/reuse. Cell sectorization usually defines a fixed sector coverage size, i.e., the azimuth, the beam width, and the power for the antenna in each of those sectors is typically a fixed quantity over time.

For example, cells may initially be deployed throughout a service area which are each divided into an equal number of sectors, such as 3 non-overlapping sectors of 120° as is common, each having a common orientation, such as orienting an α sector in a northerly direction, and a set power level associated therewith. This initial deployment is typically fixed and, therefore, does not change despite subscriber traffic and/or environmental conditions may change over time.

However, such a deployment may not adequately address network loading associated with subscriber positions, such as to accommodate areas of high loading associated with unusually dense subscriber populations such as highways, high rise office buildings, shopping malls, and even sports stadiums. Moreover, the loads within the network may not remain the same as when the network is deployed. For example, in the future, a new real estate development or highway may be constructed which will have the effect of shifting or increasing the cell traffic between one or more sectors and/or one or more cells. Similarly, network loading may present dynamics associated with subscriber behavior. For example, the above mentioned sports stadium may present heavy loading in a particular sector or sectors only during sporting events and otherwise present unusually low loading of the associated sector or sectors.

The above mentioned unbalanced loading of the network resources may lead to inefficiencies in the network and/or unacceptable or undesired operating characteristics. For example, sectorized cells often present trunking efficiency issues when a sector reaches capacity, i.e., a sector in which the subscriber is located may have reached capacity and therefore be unable to provide a traffic channel for desired communications, although traffic channels may be available in other sectors at the BTS. Additionally, sectors or cells operating at or near capacity may experience less than optimal signal quality while sectors or cells operating at lower loading may experience superior signal quality. Accordingly, sectorization efficiency is degraded when one sector reaches capacity (i.e., a sector in which the subscriber is located may have reached capacity, although capacity is available in other sectors of the BTS).

It would therefore be advantageous to have a system and method for monitoring network communication metrics, including metrics associated with communications as provided through a plurality of network resources, and thereby dynamically adjust operating parameters to redistribute network loading, or otherwise optimize network parameters.

SUMMARY OF THE INVENTION

The present invention is directed to a system and method which provides for the dynamic configuration/reconfiguration of network resources in a wireless communication system. Preferably, the present invention is implemented with respect to a cellular network, such as a network of code division multiple access (CDMA) cells, and operates to modify network operation based upon network measurements. For example, the present invention may operate to take performance measurements for each cell of a group of cells in a network and use those metrics to dynamically change the state of the network, or some portion thereof, as a function of these network measurements. Most preferably, the present invention measures or estimates the loading status of a network in order to drive changes to the network for load distribution.

According to a preferred embodiment of the invention, network measurements as utilized in modifying network operation are provided at least in part by communication control system statistics, such as switch statistics. The switch statistics so utilized may include performance pegs or performance counts, such as lost call rates, traffic usage, loading, call quality measures, and the like, that are accumulated in a system or systems, such as a switch of a mobile switching center (MSC), coupled to communication equipment associated with the cells, such as the cell site base transceiver stations (BTS). Accordingly, the system may control a group of cells, such as in the range of from approximately 10 to 200 depending on the number of cells that are coupled to a given mobile switching center, by determining performance measures for each sector of each cell in that group, and using those metrics to dynamically control one or more cell attributes and, thereby, change the state of the network.

Preferred embodiments of the present invention utilize empirical data, such as may be derived from drive testing within the network service area, in dynamically changing the state of the network. This empirical data may be utilized in conjunction with the aforementioned switch statistics to provide robust control decisions with respect to the network. For example, the aforementioned switch statistics may be analyzed to determine network resources, such as sectors or cells, experiencing excessive loading and/or undesired signal quality and those currently being under-utilized. Accordingly, a determination may be made as to network parameters to dynamically alter in order to drive the network to a more desired operation. In order to more predictably determine which particular network parameters should be altered to achieve the desired network operation, the aforementioned empirical data may be utilized in modeling the network propagation conditions, network resource coupling, and the like.

Preferably, a controller of the present invention analyzes network measurements to determine network parameter changes likely to bring about desired network operation and implements these parameter changes, or recommends these parameter changes to an implementing system, periodically. For example, a preferred embodiment controller analyzes switch statistics and estimates one or more network parameter configuration or parameter change to improve network operation and determines the network performance impact of the estimated parameter change using a modeling tool. Preferably, the modeling tool provides network signal propagation simulation, preferably using empirical data such as the aforementioned drive test data, to thereby predict the impact of an estimated parameter change. The network measurement analysis provided by the preferred embodiment controller optimizes both call quality and capacity in the network, although according to alternative embodiments the controller may optimize different parameters, such as to minimize the number of calls dropped at the expense of network capacity.

According to an embodiment of the present invention, the group of cells controlled include substantially conventional BTS technology, i.e., BTS systems which are not enhanced with "smart antenna" technology. Accordingly, the operation of the present invention may control power settings to alter cell or sector radiuses and thereby provide limited control over traffic loading among the cells and/or sectors. Moreover, preferred embodiments of the invention provide manipulation of other parameters, such as TT-drop, T-drop, T-add, neighbor lists, overload control thresholds, and the like. Accordingly, even without the aid of enhanced smart antenna technology, substantial control over traffic loading and signal qualities experienced among these cells and/or sectors may be effected.

Alternative embodiments of the present invention include one or more cells enhanced with smart antenna technology in the group of cells controlled. Accordingly, the operation of the present invention may adjust azimuths (sector orientations) and boundaries (sector widths and radii) of smart antenna enabled cell sites in addition to, or in the alternative to, adjusting parameters, such as power settings, TT-drop, T-drop, T-add, neighbor lists, and overload control thresholds, for the smart antenna enabled cell sites and/or the non-smart antenna enabled cell sites.

A technical advantage of the present invention is that operating parameter adjustments are made dynamically to optimize network performance, such as to optimize call quality and capacity in the network.

A further technical advantage is provided according to a preferred embodiment wherein network parameter adjustments are determined using switch metrics, as the dynamic adjustment of the network is based on the actual performance of the network and the network is optimized based upon criteria which is most important to the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION

Figure 1:
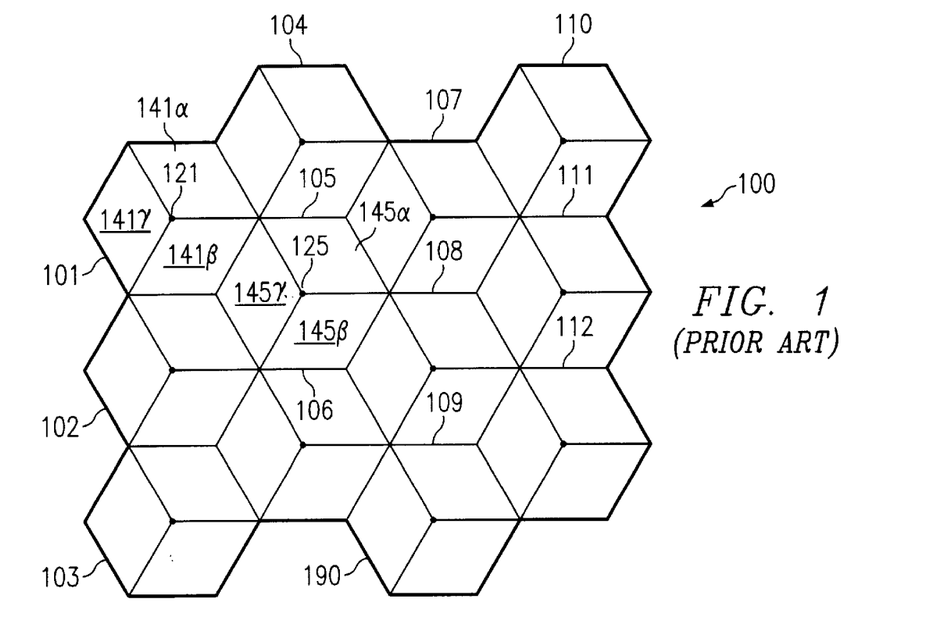
FIG. 1 shows a typical prior art cellular network.

Directing attention to FIG. 1, a typical prior art cellular wireless communication system is illustrated. Specifically, cellular network 100 is shown including individual cells 101–112 which, in aggregate, provide communications throughout service area 190. In order to provide for increased reuse of communication channels, the cells of such a communication network may utilize sectorization to thereby subdivide the service area associated with each cell into a plurality of sectors, each having a subset of the cell's communication channels associated therewith. For example, cells 101–112 of cellular network 100 are provided with 3 120° sectors, i.e., cell 101 has sectors 141α, 141β, and 141γ defined therein by base transceiver station (BTS) 121.

Such prior art cellular systems are typically implemented with a fixed configuration. Specifically, in cellular network 100, the orientation, width, and radial length of sectors 141α, 141β, and 141γ as well as the channel sets assigned to cell 101 and sectors 141α, 141β, and 141γ are determined at deployment and remain in the initial deployment configuration substantially throughout the operational life of cellular network 100. The remainder of cells of cellular network 100 are similarly provided with a fixed configuration. For example, sectors 145α, 145β, and 145γ associated with BTS 125 of cell 105 are deployed with fixed orientation, width, radial length, and channel sets. Accordingly, the boundaries between the cells, such as the boundary defined by sector 141β of cell 101 and sector 145γ of cell 105 remain fixed.

Although providing a simplified, and relatively high, reuse pattern throughout the network, such a deployment may not adequately address network loading associated with subscriber positions, such as to accommodate areas of high loading associated with unusually dense subscriber populations such as highways, high rise office buildings, shopping malls, and sports stadiums. Moreover, the loads within the network may not remain the same as when the network is deployed. For example, in the future, real estate may be developed which will have the effect of shifting or increasing the cell traffic between one or more sectors and/or one or more cells. Similarly, network loading may present dynamics associated with subscriber behavior. For example, the above mentioned sports stadium may present heavy loading in a particular sector or sectors only during sporting events and otherwise present unusually low loading of the associated sector or sectors.

Such fixed communication network systems might be occasionally reconfigured, such as by dispatching service technicians to reorient antenna arrays of the various BTSs and/or to adjust the transmit power levels of the BTS transceivers. However, such reconfiguration is typically not accomplished on a network wide scale and is generally not amenable to dynamic reconfiguring schemes, such as might be implemented with a relatively short periodicity. For example, even if a change could be implemented quickly enough at a particular cell to dynamically adjust for experienced conditions, it should be appreciated that in a communication network such as cellular network 100, such a dynamic change is likely to significantly impact other cells and, therefore, require determination of appropriate dynamic adjustments to other ones of the cells and implementation of such adjustments. Moreover, the adjustments to the other ones of the cells will further propagate the need for dynamic changes through the network, very rapidly presenting a system wide reconfiguration. However, in communication networks, such as cellular network 100, there have been substantially no systems or methods provided for determining the dynamic changes to implement in a network and providing the mechanisms to implement those changes throughout the network.

Figure 2A:
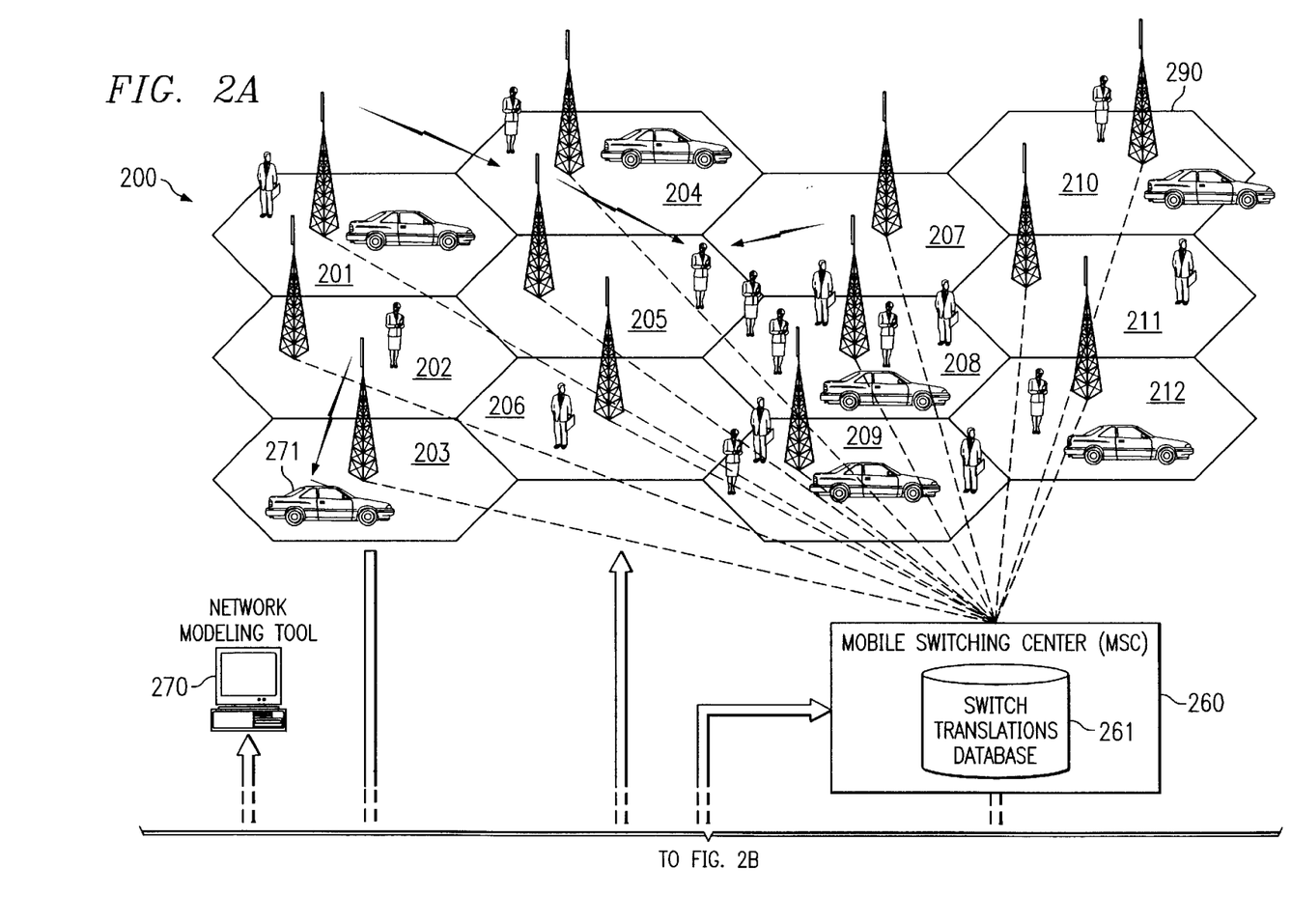
FIGS. 2A and 2B show a cellular network adapted according to a preferred embodiment of the present invention.
Figure 2B:
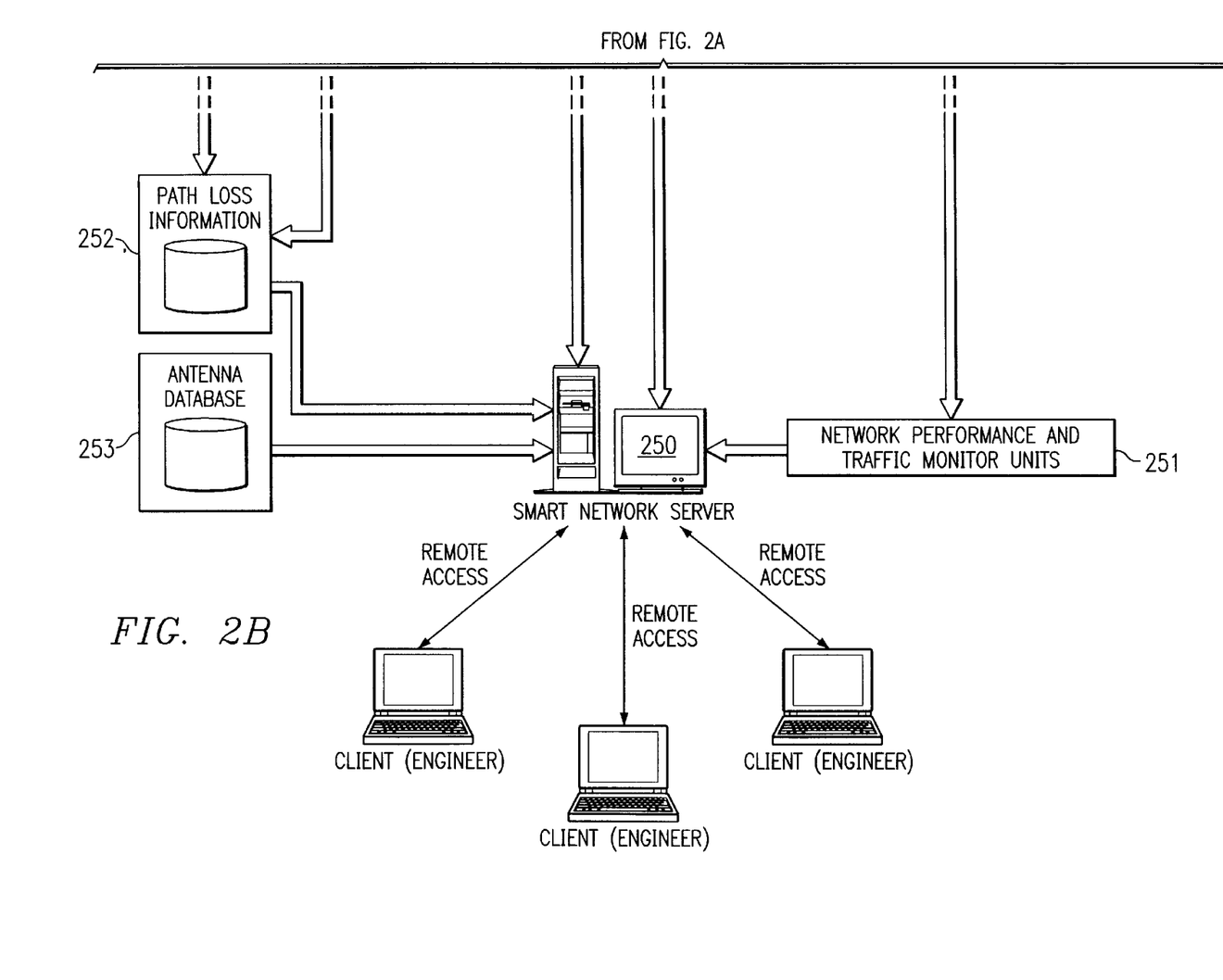

Directing attention to FIGS. 2A and 2B, a communication network adapted to dynamically optimize network operation according to a preferred embodiment of the present invention is shown generally as cellular network 200, cellular network 200, like cellular network 100 discussed above, includes a plurality of individual cells, cells 201–212, which provide communications throughout service area 290. One or more cells of cellular network 200 may be sectorized as discussed above with respect to FIG. 1. Additionally or alternatively, cells 201–212 may include substantially conventional BTSs which are not enhanced with smart antenna systems and/or BTSs which are enhanced with smart antenna systems, such as the smart antenna systems shown and described in the above referenced U.S. Pat. Nos. 5,889, 494 and 6,070,090, which incorporate the ability to dynamically change the size (width and/or length) and/or azimuth of antenna beams.

As shown in FIG. 2A mobile switching center (MSC) 260 is coupled to the BTSs of each cell of cellular network 100. MSC 260 provides control of communication channels to thereby provide communications throughout cellular network 200 as is well known in the art. Accordingly, MSC 260 includes switch translations database 261 providing parameters corresponding to the configuration of each individual base station. Those parameters may include, for example, power settings for an individual sector, neighbor lists, T-adds, T-drops, and the like. It should be appreciated that such parameters may be specific to the particular air interface implemented, such as IS95 or CDMA, and therefore may vary from those identified.

Also shown in FIG. 2B is smart network server 250 of the present invention having network modeling tool 270 associated therewith. Preferably, smart network server 250 is in communication with one or more network elements, such as MSC 260 and/or BTSs of cellular network 200, in order to monitor/measure network operation and/or to implement network reconfiguration.

A preferred embodiment smart network server 250 is provided by a general purpose processor based system, having a central processing unit, memory, and input/output devices associated therewith, operating under control of an instruction set defining operation as described herein. For example, smart network server 250 may be embodied in a personal computer system based upon the INTEL PENTIUM processing platform as is well known in the art.

According to the preferred embodiment, a single smart network server is provided for a given individual MSC. However, other configurations may be implemented, such as providing a single smart network server for multiple MSCs, where sufficient processing power is available for use by such a smart network server, or multiple smart network servers for a given individual MSC, such as where processing is to be distributed or where system redundancy is desired.

Figure 3:
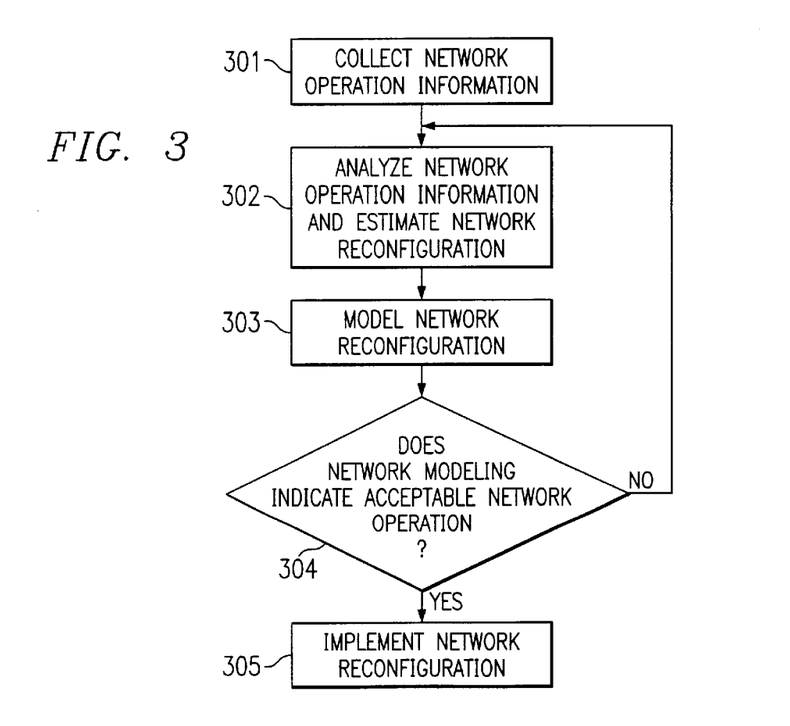
FIG. 3 shows a high level flow diagram of operation of a preferred embodiment smart network server of the present invention.
Figure 4A:
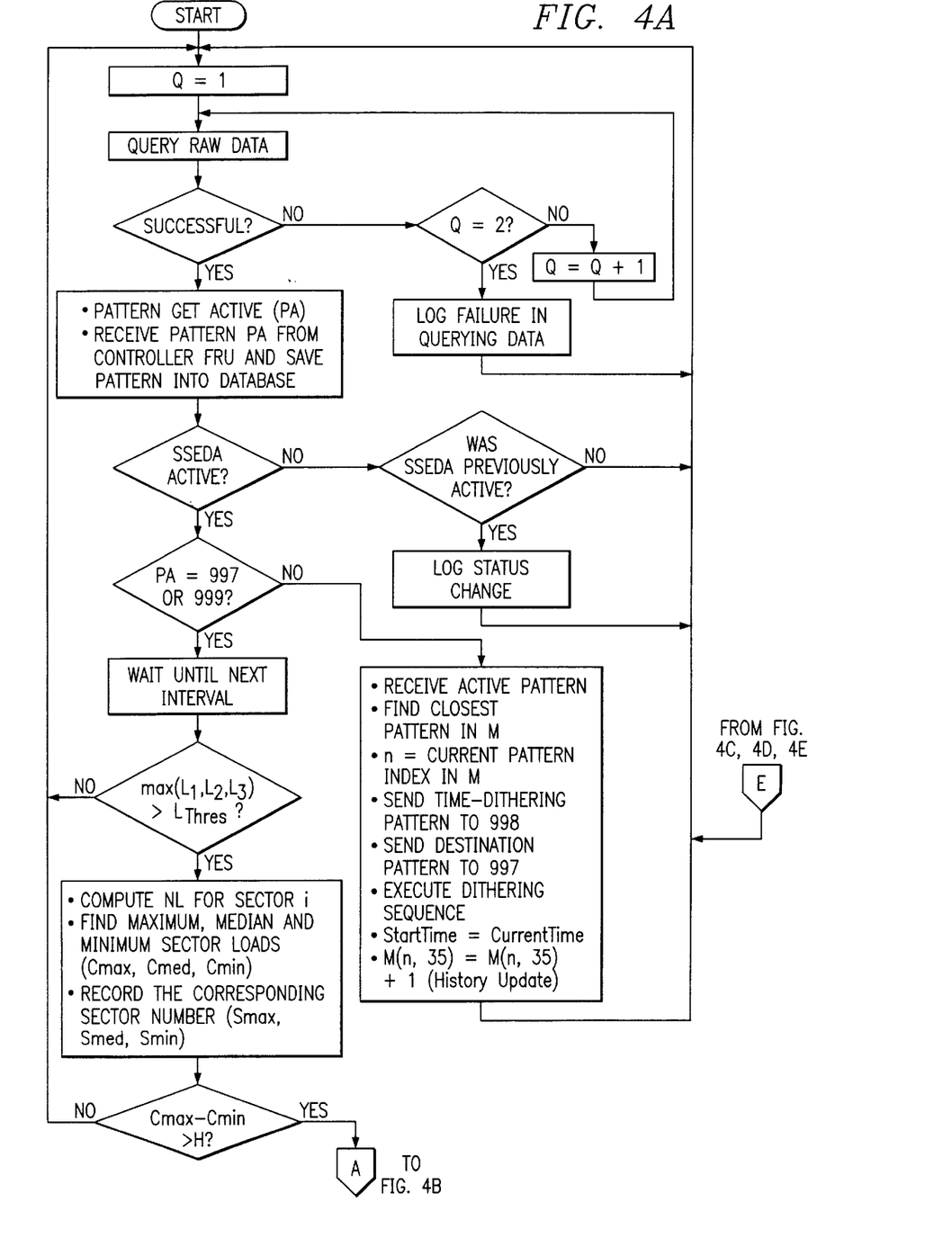
FIGS. 4A-4E show a detailed flow diagram of optimization of network parameters according to an embodiment of the present invention.
Figure 4B:
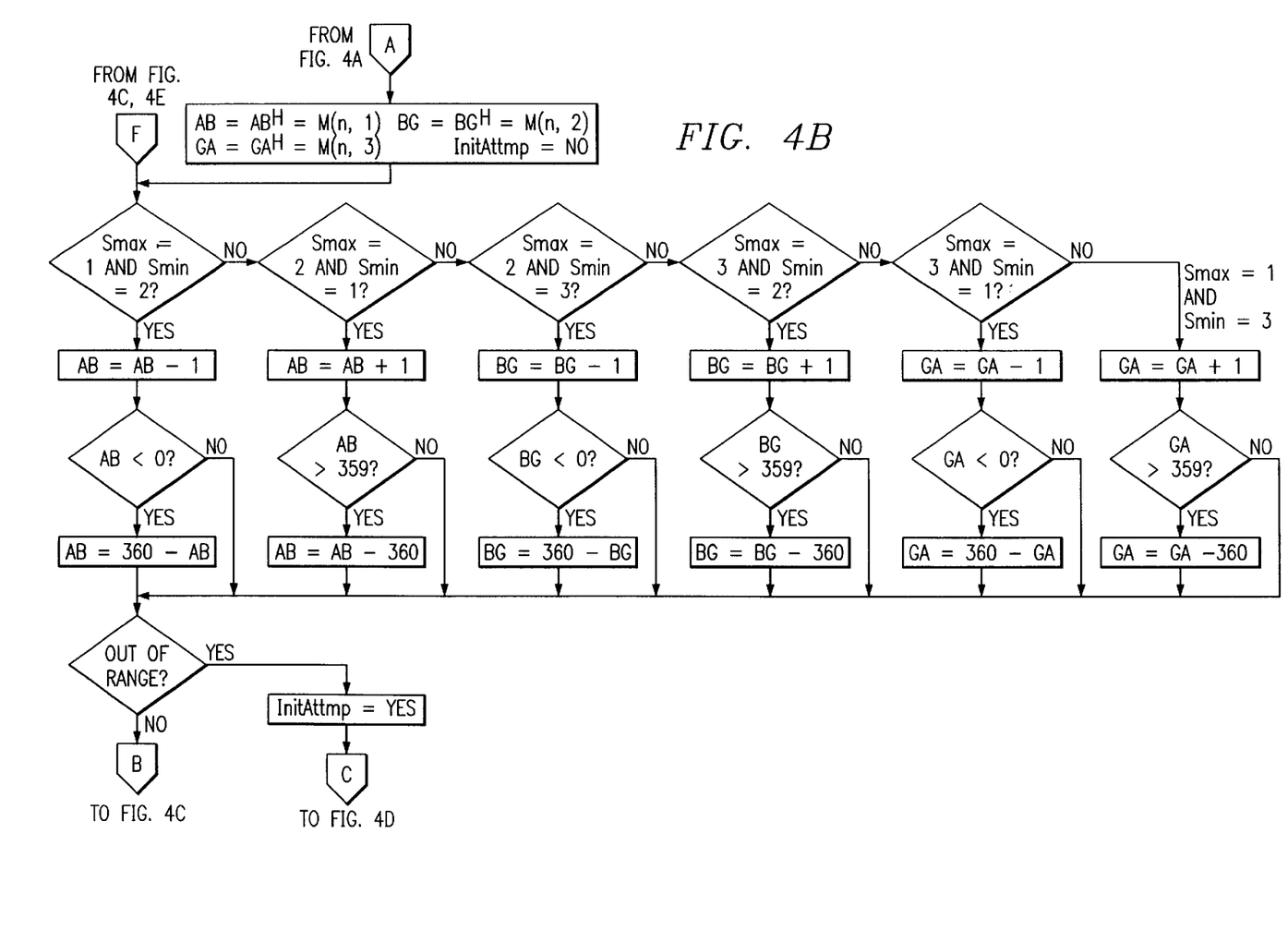
Figure 4C:
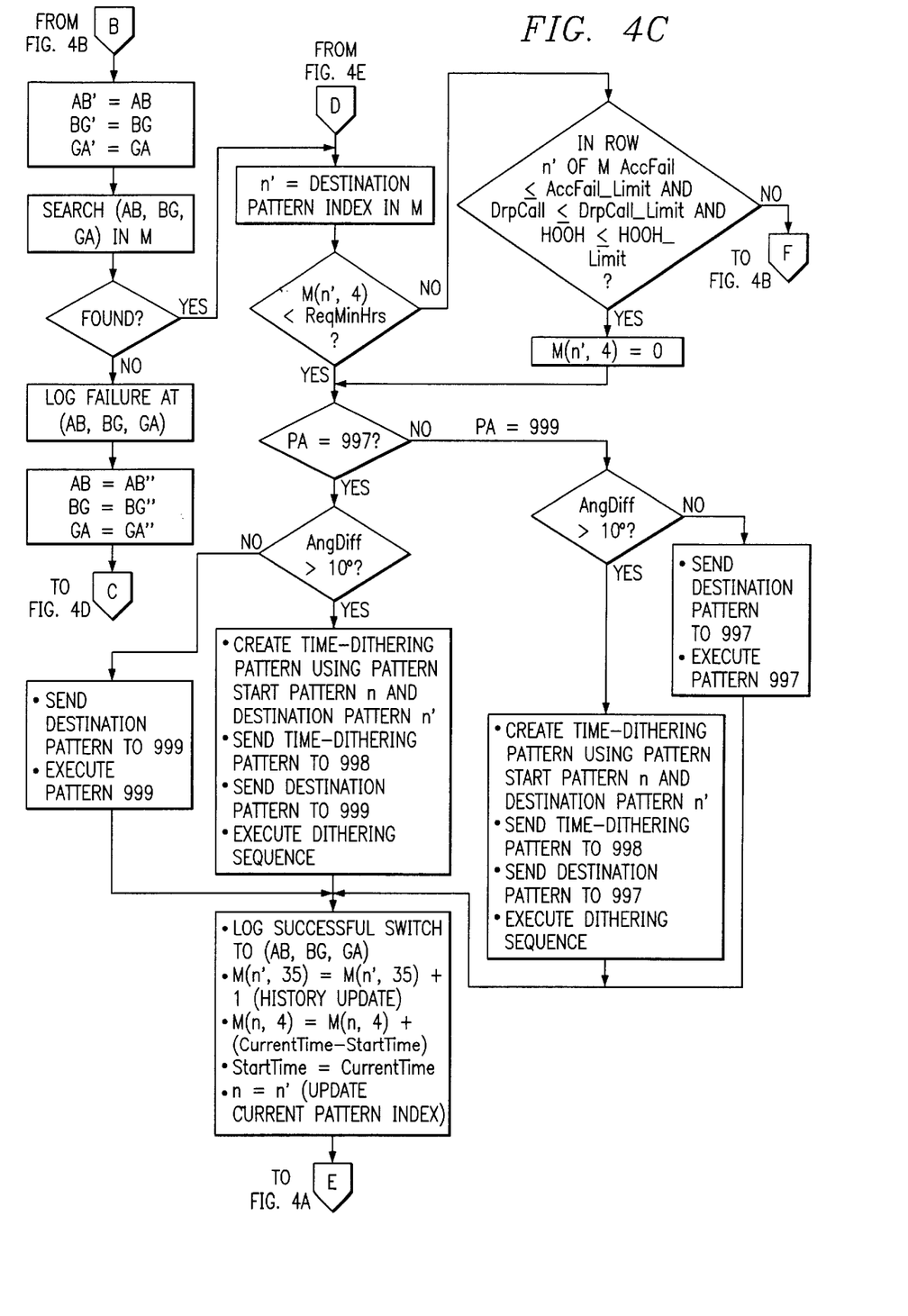
Figure 4D:
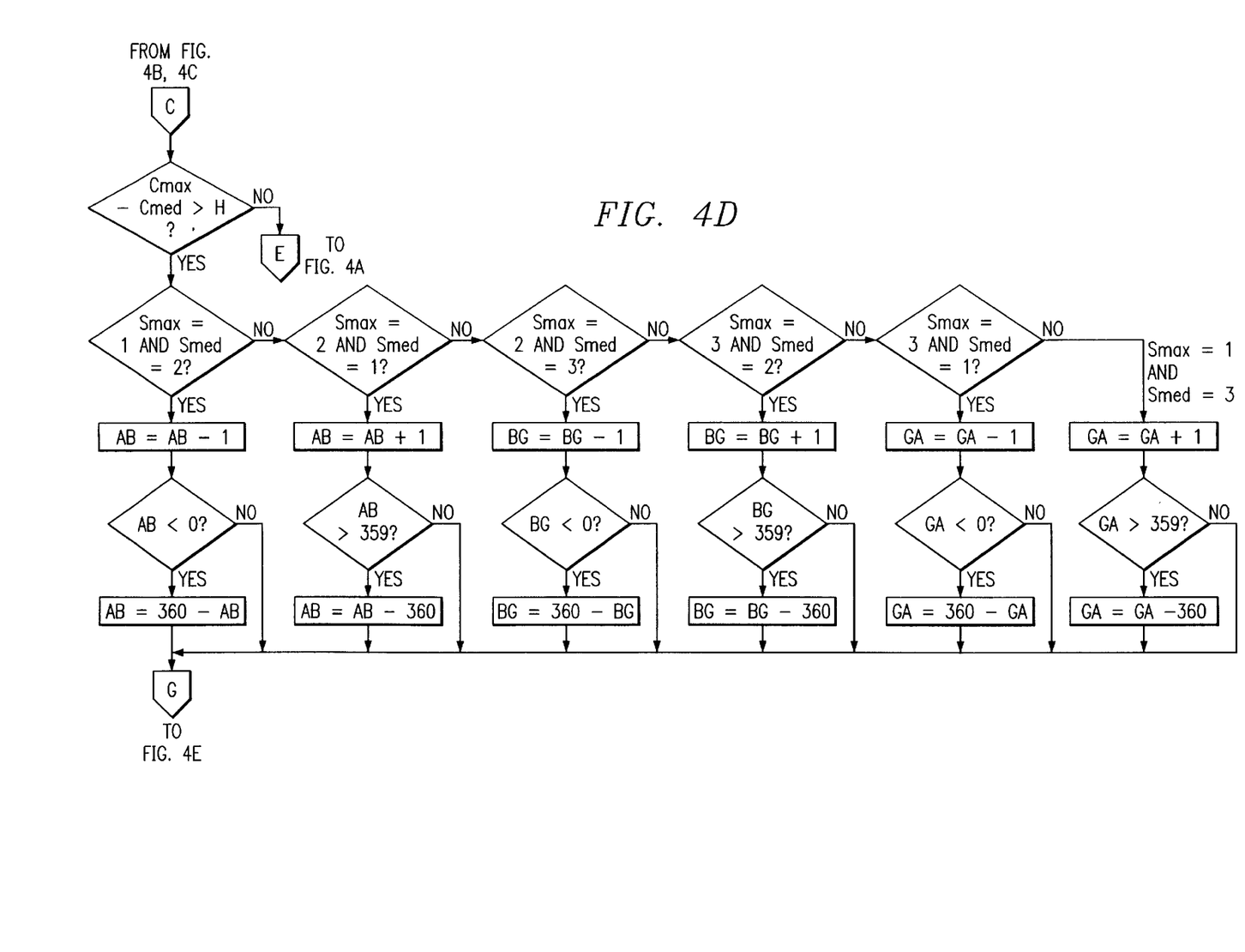
Figure 4E:
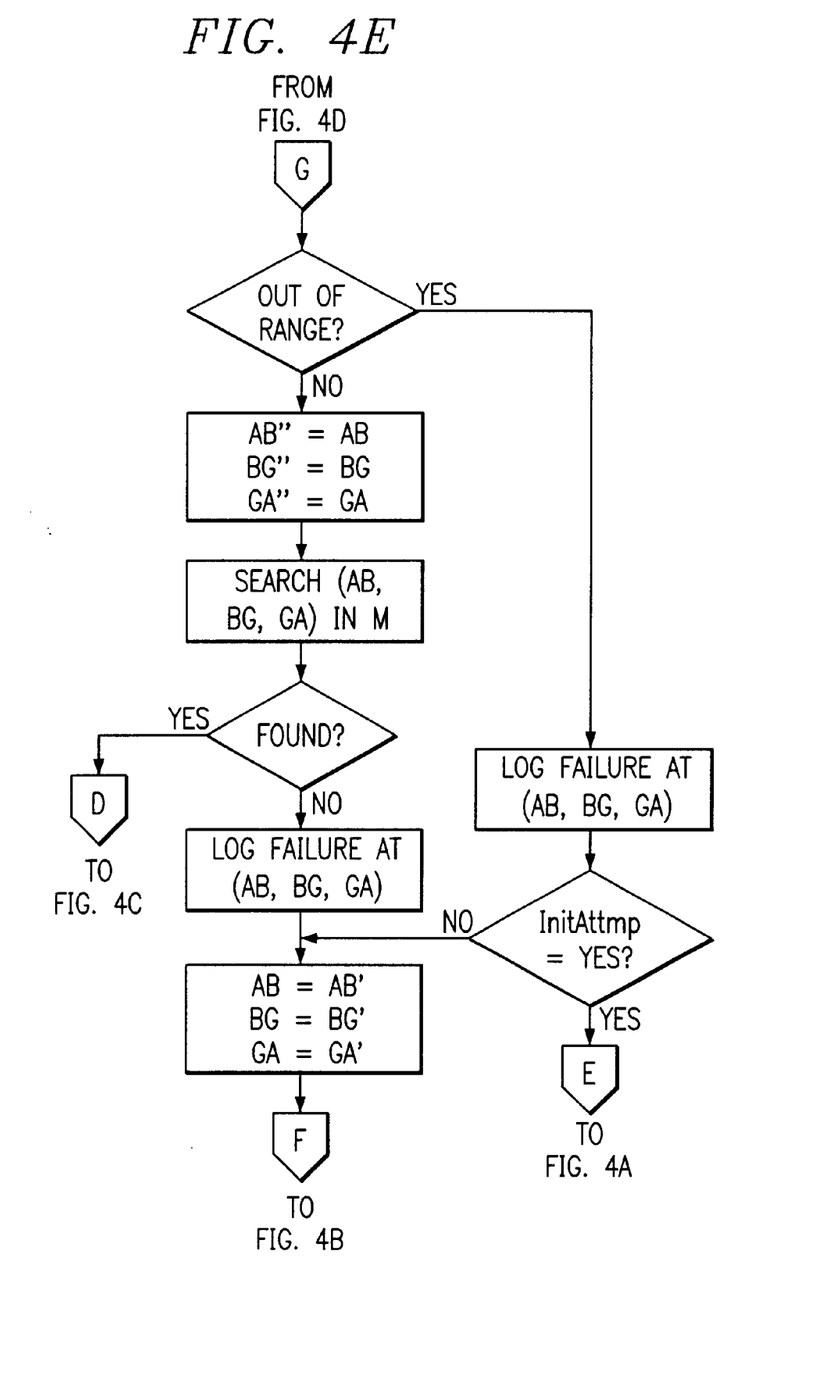

Operation of a preferred embodiment smart network server 250 is illustrated in the high level flow diagram of FIG. 3. In the illustrated embodiment, smart network server 250 collects network operation information (step 301). For example, performance peg counts (data 251 of FIG. 2B) for each base station and/or each sector may be accumulated from MSC 260 and provided to smart network server 250. These performance pegs may include information with respect to the number of calls made, the number of dropped calls on a given sector, the amount of traffic on a given sector (such as measured by assignments to a traffic channel or code usage), average power requirements for individual calls, traffic channel confirmation failures, access failures, overload information, and/or the like.

The preferred embodiment utilizes information obtained from MSC 260 as the switching metric information reflects the actual real time performance of the network. However, it should be appreciated that additional or other sources of network performance information may be used, if desired.

Where smart antenna BTSs are included in one or more cells of cellular network 200, in addition to information obtained from MSC 260, smart network server 250 may obtain network performance information from particular ones of the BTSs of cellular network 200. Data obtained from the smart antenna enabled BTSs may include reverse link measures like noise rise, and/or forward link measures like the downlink frame error rate and/or $E_c/I_0$ (such as may be determined using the forward link monitoring assemble apparatus (FLMA) shown and described in the above referenced patent application entitled "System and Method for Dynamically Adjusting CDMA Cell Sectorization"). It should be appreciated that the metric $E_c/I_0$ is a measurement of the energy per chip in the pilot channel over the total spectral density.

It should be appreciated that, although embodiments of the present invention may be implemented in a communication system having no smart antenna enhanced BTS systems deployed therein, preferred embodiments of the present invention include one or more smart antenna enhanced BTS systems, and possibly all smart antenna enhanced BTS systems. Such smart antenna enhanced BTS systems are preferred not only for the increased network performance information made available thereby, but also because their implementation can increase flexibility in reconfiguring the communication network. Such added flexibility is available in part from the preferred embodiment smart antenna's ability to adjust both the power level associated with individual sectors and the ability to adjust the azimuthal orientation and beam width of individual sectors. Moreover, the intelligent control systems of such smart antenna systems may be leveraged to provide direct communication links between smart network server 250 and the smart antenna enhanced BTSs. The added degree of flexibility provided by the smart antenna enhanced BTSs may be utilized according to the present invention to further enhance system capacity and further enhance signal quality.

Referring still to FIG. 3, operation of the preferred embodiment smart network server proceeds to analyze network operation information and estimate network reconfiguration (step 302) after collection of network operation information. Preferably, smart network server 250 implements algorithms which analyze the collected network operation information periodically and in real time. According to the preferred embodiment, the periodicity of reconfiguration determination/implementation of the present invention is selected to provide sufficient time to allow reconfiguration changes to be transmitted to the BTSs which are to implement the changes, such as directly from the smart network server (e.g. in the case of smart antenna enhanced BTSs) or through an intermediate system such as MSC 260 (e.g. in the case of substantially conventional BTSs). Moreover, the periodicity is preferably selected to allow time in which the network operation may be monitored to accurately determine the impact of the reconfiguration on network performance. Additionally or alternatively, the periodicity is selected to avoid or dampen repeated reconfiguration of the network which does not result in appreciable incremental performance improvement.

According to the preferred embodiment, the algorithms of smart network server 250 utilize the network performance pegs in order to recommend or implement network changes to result in improved network performance characteristics. One embodiment of an algorithm which may be utilized according to the present invention to recommend or implement network changes is shown in the detailed flow diagram of FIGS. 4A-4E. The flow diagram of FIGS. 4A-4E utilizes feedback from the switch in determining cell site optimization at a smart antenna enhanced BTS.

The basis of the preferred embodiment algorithm is both to improve the capacity of the network and to improve signal quality. However, it should be appreciated that these two performance metrics often present conflicts. For example, signal quality can be degraded in an effort to increase system capacity and, conversely, system capacity can be degraded in order to improve signal quality. Accordingly, in implementing the preferred embodiment algorithms a cost function is defined that weights system capacity and signal quality, and attributes associated therewith, to thereby establish threshold relationships of these relative components which are deemed to provide acceptable results. The cost function weights of the preferred embodiment may be sliding, such as to establish a goal to maximize system capacity up to a certain percent capacity while allowing signal quality only to degrade to a predetermined floor. Accordingly, as system reconfiguration begins to attain one or the other of these goals, the weighting of that component may change. Of course, alternative embodiments of the present invention may define performance goals in addition to or in the alternative to the preferred embodiment improved system capacity and improved signal quality. For example, particular system providers establish a goal to maximize capacity only.

In order to solve the large scale optimization problems associated with selecting parameters to meet the intended operational goals, the present invention may implement one or more global optimization approaches. Accordingly, preferred embodiments of the present invention utilize simulated annealing, evolutionary algorithms (or genetic algorithms), or branch and bound optimization approaches.

The smart network server algorithm of the preferred embodiment functions to, given the status of the network as determined by the various network performance measurements and information available thereto, identify potential network parameters to change and to model the impact of those changes on the network (step 303). For example, the network performance pegs may suggest that a particular sector should be enlarged in a particular direction and another sector reduced in a corresponding direction, to off load traffic onto a different cell or sector, such as where a particular cell or sector is overloaded or where a given sector or cell is experiencing poor signal quality. However, these changes typically cannot be implemented in the communication network without also significantly impacting performance of other network resources. To maintain signal quality in the network when implementing changes, the preferred embodiment uses a modeling tool, such as network modeling tool 270 of FIG. 2A, to predict the effect of any changes implemented. Accordingly, the algorithms of the preferred embodiment smart network server not only identify changes directly related to the performance pegs, but also determine the impact throughout the network of changing network parameters to adjust these performance pegs.

It should be appreciated that the network modeling tool of the preferred embodiment provides information with respect to how the network will perform in various configurations. Accordingly, the preferred embodiment network modeling tool has environmental and/or physical attribute information regarding cellular network 200 associated therewith. For example, network modeling tool 270 preferably has path loss information (path loss database 252), such as may include terrain attributes, scattering zone information, multipath information, seasonal propagation conditions (deciduous foliage conditions, rain estimates, etcetera), and the like, associated therewith in order to provide information with respect to communication links which may be established throughout cellular network 200. Additionally or alternatively, the network modeling tool has BTS configuration information (antenna database 253), such as may include antenna beam attributes (orientation horizontally and/or vertically, effective beam widths and/or lengths or ranges thereof which are available, antenna gain information, etcetera), resource configurations and capabilities (channels or spectrum which may be utilized by the transceivers, transmission power levels which may be utilized, etcetera), and the like, associated therewith in order to provide information with respect to operational and/or configurable aspects of the network resources. The network modeling tool may additionally or alternatively include empirical information and/or information collected from external sources. For example, the network modeling tool may include subscriber feedback information (not shown), such as service or coverage complaints, which may be correlated with network configuration information for use in modeling network operation.

The information associated with network modeling tool 270 of the preferred embodiment may be established in a number of ways. For example, theoretical or prophetic information may be utilized to populate some or all of the information data fields. However, the preferred embodiment utilizes information unique to the actual deployment of cellular network 200. For example, path loss database 252 may include information with respect to the actual deployment of the various BTSs of cellular network 200, such as BTS location information which may include the distances between neighboring BTSs and/or distances between BTSs and terrain conditions (buildings, hills, etcetera) which may affect signals propagated to and from the BTS antenna arrays. Additionally or alternatively, the information associated with network modeling tool 270 includes empirical information acquired from monitoring and/or testing systems of cellular network 200. For example, path loss database 252 may include actual drive test data, such as may be monitored through the use of drive test unit 271 within service area 290. Such drive test data may include $E_C/I_0$, frame error rate, $E_C/I_0$ per PN, $E_C/I_0$ combined, received power, transmit power of the mobile, and the like, providing empirical information with respect signal quality for a given network status. Moreover, drive test data may be utilized in providing information with respect to the actual path losses experienced within service area 290.

After modeling network operation using the parameter changes identified by the smart network server algorithm, a determination may be made as to whether the network modeling indicates acceptable network operation (step 304), e.g., whether predetermined goals have been reached or are within an acceptable range. Where predictions indicate that changing the identified parameters will result in undesired network operation, whether at the resources associated with the changed parameters or other resources to which effects have propagated, the algorithms of the preferred embodiment determine alternative network reconfigurations (returning to step 302), such as select different changes to the identified parameters and/or select other network parameters to change. Accordingly, operation of the preferred embodiment smart network server algorithm may perform multiple iterations of the network operation analysis and network configuration modeling in order to analyze various different configuration changes and to determine a near optimal solution, based upon the selected criteria (signal quality and system capacity in the preferred embodiment).

If, however, a determination is made that the network modeling indicates acceptable network operation, the preferred embodiment implements the determined network reconfiguration (step 305). Accordingly, information with respect to the desired new configuration may be provided to the various network resources for implementation. For example, information may be fed to MSC 260 by smart network server 250 to adjust switch translation parameters and/or to pass configuration changes on to individual BTSs of cellular network 200. Additionally, information with respect to the desired new configuration may be provided directly to BTSs for implementation, such as where cellular network 200 includes BTSs which are enhanced with smart antenna systems. Accordingly, operation of the preferred embodiment not only provides improvement to operation of a single cell site, but the overall network wide performance is improved, such as by shifting and sharing the load between the cell sites.

It should be appreciated that, although not illustrated in the steps of FIG. 3, the changes implemented according to the present invention may be further refined by monitoring the network performance parameters, e.g. analyzing the switch data etcetera, to determine the actual impact of the changes with respect to the identified goals. This information may be utilized to fine tune network changes and/or to modify the modeling tool in order to provide more accurate network operation predictions. For example, as network operation changes are implemented, the smart network server of the present invention may receive feedback from the switch useful in determining whether the implemented change was successful or if it resulted in undesired network behavior.

The parameter changes promulgated by the smart network server of the preferred embodiment may be made with respect to particular sectors or cells. These parameter changes may include making system configuration changes, such as changes to neighbor lists, overload control thresholds, etcetera, and/or air interface changes such as power changes (transmission and/or reception power level changes), T-adds, T-drops, etcetera. Where smart antenna enhanced BTSs are present in cellular network 200, the parameter changes promulgated by the smart network server of the preferred embodiment may include metrics in addition to or in the alternative to those discussed above, such as sector azimuthal orientation, sector or cell elevational orientation (down tilt), sector width, sector or cell length, sector overlap, sector or cell channel assignments, and the like.

It should be appreciated that T-adds and T-drops are handoff thresholds which may be utilized according to the present invention to indirectly adjust sector or cell boundaries. For example, as subscriber units move within the network measuring the pilot signal strength (which defines sectors), if the pilot strength is above T-add, it suggests that the subscriber unit should be in handoff with that sector because there is sufficient energy and sufficient signal-to-noise ratio to provide a suitable communication link. Conversely, if the subscriber unit is in handoff with a specific sector, and it measures the pilot signal strength to be below T-drop, the quality, and therefore the benefit of that link is greatly diminished and, therefore, it likely desirable to end its handoff with that sector. Accordingly, by adjusting these parameters, according to the present invention, the network may be reconfigured to provide desired performance characteristics.

It should be appreciated that there may be appreciable complexity in implementing network configuration changes through the MSC as described in the preferred embodiment. For example, it may not be possible to control when configuration changes are propagated to and implemented by the various BTSs coupled to the MSC thus providing unpredictable results during the parameter changes. Accordingly, it may be desirable to adapt BTSs, such as those which hare not smart antenna enhanced, for direct communication with the smart network server of the present invention. Additionally or alternatively, the control algorithms of the BTSs may be adapted to implement changes simultaneously, irrespective of when the new parameters are communicated to the BTSs by the MSC, such as through a common timing signal or the like.

Although the above described preferred embodiment has been discussed with respect to being adapted to provide control of parameters at all cells of cellular network 200, it should be appreciated that alternative embodiments may be configured so as to dynamic control of only a subset of the cells. For example, cellular network 200 may be populated with a certain number of smart antenna enhanced BTSs where only these BTSs are dynamically configured when attempting to achieve desired network performance characteristics. Such an embodiment may significantly simplify implementation of the present invention because the parameter set optimized is substantially reduced in addition to any communication difficulties associated with indirect communication through the MSC being avoided. Of course, the network operation metrics associated with the cell sites not being dynamically controlled may be analyzed for control of those cell sites for which dynamic control is provided, in order to optimize performance throughout the network, if desired.

It should be appreciated that, although the preferred embodiment has been described herein with respect to a CDMA air interface, the present invention may be utilized with any air interface standard, including frequency division multiple access (FDMA), time division multiple access (TDMA), and time division duplex (TDD). Moreover, although preferred embodiments have been described with reference to cellular telephony systems, it should be appreciated that the concepts of the present invention may be applied to a variety of communication networks.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for dynamically reconfiguring a communication network, said system comprising:
    a communication control system interface;
    a network modeling tool;
    at least one predetermined network optimization goal; and
    processor logic in communication with said communication control system interface and said network modeling tool, wherein said processor logic accepts network performance information from said communication control system interface and estimates a communication network parameter change as a function of the network performance information and using said network modeling tool determines if operation of said communication network reconfigured with said communication network parameter change approaches said predetermined network optimization goal.

2. The system of claim 1, wherein said communication control system interface is adapted to interface with a network switching controller.

3. The system of claim 2, wherein said network switching controller comprises a mobile switching center.

4. The system of claim 2, wherein said network performance information comprises switch metrics.

5. The system of claim 4, wherein said switch metrics are provided to said processor logic in substantially real-time.

6. The system of claim 4, wherein said switch metrics include information selected from the group consisting of:
    a number of calls made;
    a number of dropped calls on a given sector;
    an amount of traffic on a given sector;
    an average power requirement for individual calls;
    traffic channel confirmation failures;
    access failures; and
    overload information.

7. The system of claim 1, wherein said network modeling tool comprises path loss information.

8. The system of claim 7, wherein said path loss information includes theoretical path losses associated with said communication network.

9. The system of claim 7, wherein said path loss information includes empirical path loss information measured within said communication network.

10. The system of claim 9, further comprising:
    a drive test unit operable to measure path loss information within said communication network and to provide said empirical path loss information to said network modeling tool.

11. The system of claim 7, wherein said path loss information comprises information selected from the group consisting of:
    terrain attributes;
    scattering zone information;
    multi-path information; and
    seasonal propagation conditions.

12. The system of claim 1, wherein said network modeling tool comprises network configuration information.

13. The system of claim 12, wherein said network configuration information comprises information selected from the group consisting of:
    sector horizontal beamwidth;
    sector vertical beamwidth;
    sector azimuth;
    sector downtilt;
    sector gain;
    information with respect to channels which may be utilized by communication devices of the communication network; and
    information with respect to transmission power levels which may be utilized.

14. The system of claim 1, wherein said processor logic provides information with respect to said communication network parameter change to said communication control system interface for implementing said communication network parameter change in said communication network.

15. The system of claim 14, wherein said information with respect to said communication network parameter change comprises transmitter power setting information.

16. The system of claim 14, wherein said information with respect to said communication network parameter change comprises TT-drop setting information.

17. The system of claim 14, wherein said information with respect to said communication network parameter change comprises T-drop setting information.

18. The system of claim 14, wherein said information with respect to said communication network parameter change comprises T-add setting information.

19. The system of claim 14, wherein said information with respect to said communication network parameter change comprises neighbor list information.

20. The system of claim 14, wherein said information with respect to said communication network parameter change comprises overload control threshold information.

21. The system of claim 1, further comprising:
a network element interface.

22. The system of claim 21, wherein said network element interface is adapted to interface with at least one base station of said communication network.

23. The system of claim 22, wherein said at least one base station includes a base station not enhanced with a smart antenna system.

24. The system of claim 22, wherein said at least one base station includes a smart antenna enhanced base station.

25. The system of claim 24, wherein said processor logic provides information with respect to said communication network parameter change to said network element interface for implementing said communication network parameter change in said communication network.

26. The system of claim 25, wherein said information with respect to said communication network parameter change comprises information with respect to a sector orientation adjustment at said at least one base station.

27. The system of claim 25, wherein said information with respect to said communication network parameter change comprises information with respect to a sector boundary adjustment at said at least one base station.

28. The system of claim 1, wherein said at least one predetermined network optimization goal includes a performance goal with respect to capacity.

29. The system of claim 1, wherein said at least one predetermined network optimization goal includes a performance goal with respect to network quality.

30. The system of claim 1, wherein said at least one predetermined network optimization goal includes a performance goal with respect to capacity and a performance goal with respect to signal quality.

31. The system of claim 1, wherein said communication network comprises a cellular communication network.

32. The system of claim 31, wherein said cellular communication network comprises a personal communication services network.

33. A method of dynamically reconfiguring a communication network, said method comprising:
obtaining network performance information substantially in real-time from a communication control system;
estimating network system parameter adjustments as a function of said network performance information;
modeling network performance using said estimated network system parameter adjustments;
determining if a desired network performance improvement would result from implementation of said estimated network system parameter adjustments from information provided by the network performance modeling;
repeating the network system parameter adjustment estimating if said desired network performance improvement is not determined to result;
providing information with respect to said estimated network system parameter adjustments to said communication control system if said desired network performance improvement is determined to result; and
implementing said estimated network system parameter adjustments within said communication network.

34. The method of claim 33, wherein said communication network comprises a cellular communication network, and wherein said communication control system comprises a mobile switching center of said cellular communication network.

35. The method of claim 34, wherein said cellular communication network comprises a personal communication services (PCS) network.

36. The method of claim 34, wherein implementing said estimated network system parameter adjustments comprises adjusting information in a switch translation database of said mobile switching center.

37. The method of claim 36, wherein implementing said estimated network system parameter adjustments further comprises said mobile switching center propagating said estimated network system parameter adjustments to cell site base stations of said cellular network.

38. The method of claim 34, further comprising:
providing information with respect to said estimated network system parameter adjustments to individual base stations of said cellular network, wherein implementing said estimated network system parameter adjustments comprises adjusting operation of ones of said individual base stations.

39. The method of claim 38, wherein said individual base stations are smart antenna enhanced base stations.

40. The method of claim 38, wherein implementing said adjusting operation of said ones of said individual base stations comprises adjusting a sector width.

41. The method of claim 38, wherein implementing said adjusting operation of said ones of said individual base stations comprises adjusting a sector azimuth.

42. The method of claim 34, wherein said estimated network system parameter adjustments comprise a parameter adjustment associated with a cell of said cellular network for which said network performance information indicates optimization is desirable and further comprises a plurality of corresponding parameter adjustments associated with other cells of said cellular network for maintaining at least a minimum network performance threshold with respect to the other cells of said cellular network.

43. The method of claim 42, wherein said parameter adjustment associated with said cell comprises a parameter to adjust a service area boundary of said cell.

44. The method of claim 43, wherein said service area boundary comprises a sector boundary.

45. The method of claim 33, wherein said network performance information includes a number of communication sessions made using particular network resources.

46. The method of claim 33, wherein said network performance information includes a number of dropped communication sessions associated with particular network resources.

47. The method of claim 33, wherein said network performance information includes an amount of traffic on associated with particular network resources.

48. The method of claim 33, wherein said network performance information includes an average power requirement for individual communication sessions.

49. The method of claim 33, wherein said network performance information includes information with respect to access failures.

50. The method of claim 33, wherein said network performance information includes information with respect to traffic channel confirmation failures.

51. The method of claim 33, wherein said network performance information includes overload information.

52. The method of claim 33, wherein said desired network performance improvement comprises a capacity improvement.

53. The method of claim 33, wherein said desired network performance improvement comprises a network performance quality improvement.

54. The method of claim 33, wherein said network performance modeling further uses path loss information associated with said communication network.

55. The method of claim 54, further comprising:

accumulating drive test data within said communication network;

providing said accumulated drive test data to a network modeling tool for use in said network performance modeling.

56. The method of claim 33, wherein said network performance modeling further uses network configuration information.

57. The method of claim 33, wherein said network performance modeling further uses subscriber feedback information.

58. The method of claim 33, further comprising:

monitoring said communication network after implementing said estimated network system parameter adjustments.

59. The method of claim 58, further comprising:

reestimating said network system parameter adjustments as a function of information from said monitoring said communication network after implementing said estimated network system parameter adjustments.

60. The method of claim 59, further comprising:

adjusting a modeling database used in said modeling network performance as a function of information from said monitoring said communication network after implementing said estimated network system parameter adjustments.

61. A method of dynamically reconfiguring operation of a group of cells of a cellular network, said method comprising:

obtaining network operating statistics from a mobile switching center coupled to said group of cells;

identifying an operational characteristic of at least one cell of said group of cells which is not consistent with a predetermined performance goal associated with said cellular network;

determining an operational parameter adjustment to bring said operational characteristic in consistency with said predetermined performance goal;

determining a corresponding operational parameter adjustment to maintain an additional operational characteristic of at least another cell of said group of cells in consistency with said predetermined performance goal;

modeling implementation within said cellular network of said operational parameter adjustment and said corresponding operational parameter adjustment;

determining if implementation of said operational parameter adjustment and said corresponding operational parameter adjustment provide desired network performance characteristics;

repeating said operational parameter adjustment determining, said corresponding operational parameter adjustment determining, and said implementation modeling if said implementation is determined not to provide desired network performance characteristics; and providing information with respect to at least one of said operational parameter adjustment and said corresponding operational parameter adjustment to said mobile switching center for implementation within said cellular network.

62. The method of claim 61, further comprising:

monitoring operation of said cellular network after providing said information to said mobile switching center; and determining if said implementation results desired network performance characteristics.

63. The method of claim 62, further comprising:

adjusting a modeling database used in said implementation modeling if said implementation is determined not to result in desired network performance characteristics.

64. The method of claim 62, further comprising:

determining an operational parameter adjustment as a function of said monitored operation of said cellular network if said implementation is determined not to result in desired network performance characteristics.

65. The method of claim 61, further comprising:

providing information with respect to at least one of said operational parameter adjustment and said corresponding operational parameter adjustment to at least one base station associated with said group of cells.

* * * * *